Dec. 19, 1944.    C. R. NALLE    2,365,287

ADJUSTABLE CASTER

Filed Jan. 11, 1944

Inventor:—
Charles R. Nalle
by his Attorneys
Howson & Howson

Patented Dec. 19, 1944

2,365,287

UNITED STATES PATENT OFFICE 2,365,287

ADJUSTABLE CASTER

Charles R. Nalle, Philadelphia, Pa.

Application January 11, 1944, Serial No. 517,830

6 Claims. (Cl. 16—19)

This invention relates to adjustable casters, and particularly to a caster which is adapted for use in the conventional type of socket as normally employed with the common non-adjustable wheel or glide type devices which are usually provided in practically all kinds of movable articles of furniture, including tables, desks, cabinets, etc.

The conventional socket normally includes an elongated neck which is adapted to be inserted or driven into a boring made in the lower end of a table leg or in the bottom framework of a cabinet, desk, etc. The socket is normally provided, at its lower end, with a bearing or wear plate having a toothed peripheral flange arranged to be driven into the woodwork of the article to secure the socket in place. The opposite end of the neck of the socket is usually slotted or recessed longitudinally, and contracted radially, to engage an annular shoulder on the underside of the head of the ordinary caster stem. The stem of the caster is adapted to be inserted in the socket and is normally provided with a circular enlargement which is adapted to bear against the bearing or wear plate at the outer or lower end of the socket. Below the enlargement on the caster stem, the caster stem is provided with a floor-engaging element of either the glide type, in the form of a button-like element, molded on or otherwise secured to the stem, or the type which includes a roller mounted in a horn or yoke secured to the stem, below the aforesaid enlargement thereof.

The adjustable caster of the present invention is adapted to be interchangeable with and to replace the conventional caster structure, above described. In the present instance, the caster of the present invention is provided with a stem of the same general type as noted above and which may be inserted into the conventional socket in the same general manner, as noted above. However, below the bearing enlargement on the stem, the stem of the caster of the present invention is provided with means by which the floor-engaging element carried thereby may be adjusted axially of and relative to the stem, for the purpose of leveling or steadying the article of furniture to which the caster is applied, in order to compensate for variations in the floor on which the article of furniture is resting.

One object of the invention is to provide an adjustable caster of simple, efficient, inexpensive construction, capable of interchangeable installation in the common conventional sockets of articles of furniture, without requiring the use of special tools, as an ordinary screw driver or similar implement will suffice to pry or remove the old type of caster from the conventional socket ready for reception of the stem of the adjustable caster of the present invention, which latter may be readily placed in operating position in the conventional socket merely by the application of force axially upon the stem of the caster.

The construction and operation of the caster structure of the present invention will be fully described hereinafter, reference being had to the accompanying drawing of which:

Fig. 1 is a side elevation of the structure as applied to the lower end of the leg of a table or the like;

Figure 1:
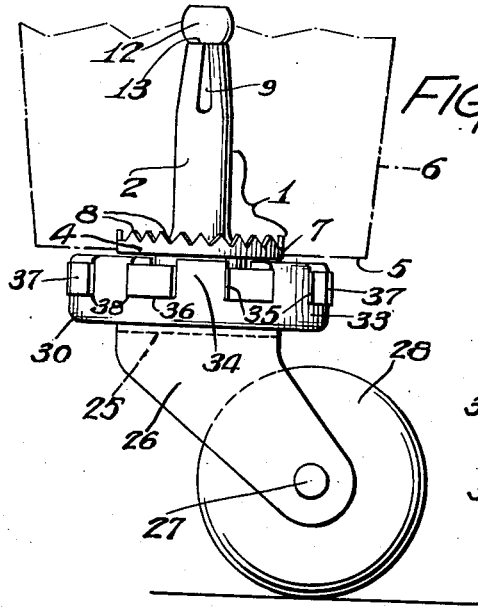
Figure 2:
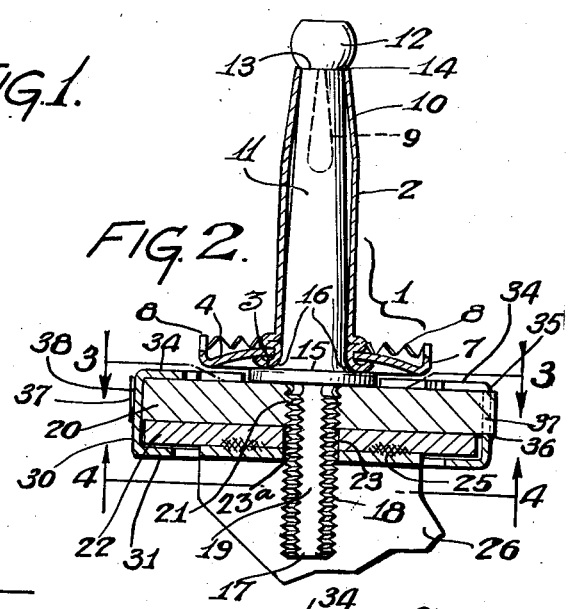
Fig. 2 is a sectional elevation as taken on the line 2—2, Fig. 3.
Figure 3:
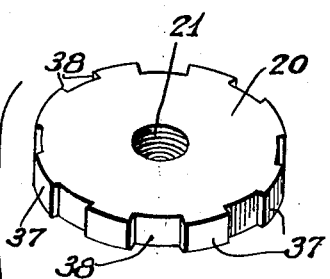
Fig. 3 is a sectional plan view taken on the line 3—3, Fig. 2.
Figure 5:
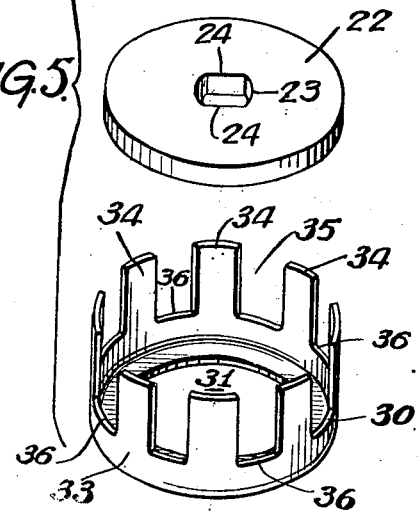
Fig. 5 is a detachable perspective view of the essential elements of the caster of the present invention.
Figure 4:
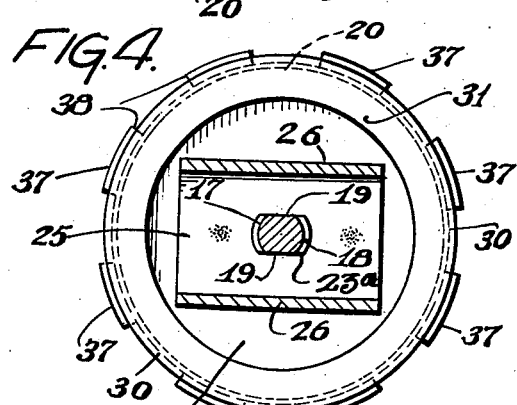
Fig. 4 is an inverted sectional plan view taken on the line 4—4, Fig. 2.

As shown in Figs. 1 and 2, the conventional socket 1 includes an elongated tubular neck 2, to one end of which is fitted the usual bearing plate or base 4. The base plate 4 is adapted to be seated against the under surface 5 of a leg or framework 6 of a table or other article of furniture. The marginal edge of the base plate 4 is provided with an up-turned flange 7 in which is formed a series of teeth 8. The teeth 8 are adapted to be driven into the framework 6 to secure the socket 1 in position. The opposite end of the neck 2 is longitudinally slotted or recessed at 9, and is radially contracted into the form of a cone-frustum 10.

Both the conventional type of caster, and the caster of the present invention, includes an upper stem 11 which is adapted to be inserted axially into the neck 2 of the socket 1. The free end of the stem 11 is provided with a head 12 affording an annular overhanging shoulder 13 under and against which the upper radially contracted resilient edge 14 of the neck 2 is adapted to bear, for removably retaining the stem 11 in the neck 2 of the socket 1.

The opposite end of the upper stem 11 is provided with an enlargement 15, and, in some instances at least, with an annularly fileted bearing surface or supporting shoulder 16 adapted to bear against a correspondingly fileted bearing surface 3 of the socket 1.

In the present instance, below the shoulder enlargement 15, the lower part of the stem 11 is extended axially, as indicated at 17, and is provided with screw threads 18. The diametrically opposite sides of the lower stem 17 are flattened throughout the length of the lower stem 17, as indicated at 19, 19.

Rotatably mounted on the lower stem 17 is a disc 20 which is provided with internal screw threads 21 adapted to cooperate with the external screw threads 18 of the lower stem 17 to effect axial adjustment of the disc 20 on and relative to the stem 17, between the stem enlargement 15 and the free end of the screw threaded axial extension 17 of the stem 11.

Adapted to bear against the underside of the rotatable disc 20 is a second non-rotatable disc 22. The disc 22 is provided with a central plain opening 23, for reception of the lower stem 17, and the opposite sides of the central opening 23 are flattened, as indicated at 24, 24, to bear against the flat sides 19, 19 of the lower stem 17 to afford a splined connection and prevent relative rotation between the disc 22 and the lower stem 17, while permitting relative axial sliding therebetween.

Spot welded or otherwise secured to the underside of the non-rotating disc 22, in the present instance, is a cross-plate 25 of a caster yoke or horn, which is provided with a central plain opening 23a of the same size and shape as the opening 23 in the disc 22, for passage of the flattened stem 17. From the opposite sides respectively of the plate 25 extend the arms 26, 26 of the roller supporting yoke or horn. Between the arms 26, 26 is mounted, for relative rotation about an axle 27, the caster wheel 28, the opposite ends of the roller axle or pin 27 being secured in the arms 26, 26 in any suitable manner, as by riveting or by peening.

The discs 20 and 22 are retained in concentric relation to each other for relative rotation, while preventing any substantial relative axial movement therebetween, by a retaining ring 30, which includes an annular inturned flange 31 underlying the marginal edge portion of the disc 22, and a cylindrical body 33 surrounding the peripheral face of the disc 22.

The retaining ring 30 also includes a series of axially extending tongues 34 which alternate with axially extending recesses 35 formed in the upper edge of the cylindrical body 33 of the retaining ring 30, the distance between the plane of the bases 36 of the recesses 35, 35 and the plane of the upper surfaces of the inturned flange 31 of the ring 30 being slightly greater than the thickness of the disc 22 to permit said relative rotation and prevent said relative axial movement between the discs 20 and 22.

The peripheral edge of the disc 20 is provided with alternating radial lugs 37, 37, which are adapted to fit into the recesses 35, 35 respectively of the retaining ring 30, and radial recesses 38, 38 which are respectively adapted to receive the axial tongues 34, 34 of the retaining ring 30.

The upper ends of the tongues 34, 34 are adapted to be bent radially inward over the upper surface of the disc 20 and to hold the under surface of the lugs 37, 37 of the disc 20 in firm contact with the base surfaces 36, 36 of the recesses 35, 35 in the retaining ring 30, whereby the ring 30 and the disc 20 become, for all intents and purposes, a single integral hand wheel for effecting adjustment of the caster floor contacting element 28 axially on and with respect to the stem 11—17 of the caster.

In order to facilitate the turning of the nut disc 20 on the threaded stem 17, the lugs 37, 37 may be extended radially outward beyond the tongues 34, 34 to provide a superior gripping surface on the peripheral edge of the operating hand wheel formed by the nut disc 20 and the retaining ring 30.

I claim:

1. An adjustable caster comprising a stem including a swivel bearing shoulder intermediate the opposite ends thereof, screw threads formed on said stem below said shoulder, a disc having a threaded bore and rotatably mounted on the threaded end of the spindle, a bearing disc underlying the threaded disc and splined to said spindle against relative rotation with respect thereto, and a floor engaging element carried by said bearing disc.

2. An adjustable caster comprising a stem including a swivel bearing shoulder intermediate the opposite ends thereof, screw threads formed on said stem below said shoulder, a disc having a threaded bore and rotatably mounted on the threaded end of the spindle, a bearing disc underlying the threaded disc and splined to said spindle against relative rotation with respect thereto, a floor engaging element carried by said bearing disc, and means for maintaining said bearing disc against axial displacement from said threaded disc while affording relative rotation between said discs.

3. An adjustable caster comprising a stem including a swivel bearing shoulder intermediate the opposite ends thereof, screw threads formed on said stem below said shoulder, a disc having a threaded bore and rotatably mounted on the threaded end of the spindle, a bearing disc underlying the threaded disc and splined to said spindle against relative rotation with respect thereto, a floor engaging element carried by said bearing disc, and a retaining ring encasing the peripheral edges of said discs and preventing relative axial displacement thereof while affording relative rotation therebetween.

4. An adjustable caster comprising a stem including a swivel bearing shoulder intermediate the opposite ends thereof, screw threads formed on said stem below said shoulder, a disc having a threaded bore and rotatably mounted on the threaded end of the spindle, a bearing disc underlying the threaded disc and splined to said spindle against relative rotation with respect thereto, a floor engaging element carried by said bearing disc, a ring surrounding the peripheral edges of said discs, means for securing said ring to said threaded disc, and an inturned flange on said ring underlying said bearing disc and preventing axial displacement of said discs while affording relative rotation therebetween.

5. An adjustable caster comprising a stem including a swivel bearing shoulder intermediate the opposite ends thereof, screw threads formed on said stem below said shoulder, a disc having a threaded bore and rotatably mounted on the threaded end of the spindle, a bearing disc underlying the threaded disc and splined to said spindle against relative rotation with respect thereto, a floor engaging element carried by said bearing disc, a ring surrounding the peripheral edge of said bearing disc, tongues on said ring extending axially into recesses formed in the peripheral edge of said threaded disc, inturned ends on said tongues overlying the upper surface of said threaded disc, and an inturned flange on said ring underlying said bearing disc to prevent relative axial displacement of said discs while affording relative rotation therebetween.

6. An adjustable caster comprising a stem including a swivel bearing shoulder intermediate the opposite ends thereof, screw threads formed on said stem below said shoulder, a disc having a threaded bore and rotatably mounted on the threaded end of the spindle, a bearing disc underlying the threaded disc and splined to said spindle against relative rotation with respect thereto, a floor engaging element carried by said bearing disc, a ring surrounding the peripheral edge of said bearing disc, tongues on said ring extending axially into recesses formed in the peripheral edge of said threaded disc, inturned ends on said tongues overlying the upper surface of said threaded disc, an inturned flange on said ring underlying said bearing disc to prevent relative axial displacement of said discs while affording relative rotation therebetween, and lugs on said threaded disc projecting radially beyond said ring and affording a gripping surface for facilitating rotation of said threaded disc and said ring as a unit.

CHARLES R. NALLE.